March 14, 1967  F. G. M. FERRIE ET AL  3,308,623
ELECTRO-THERMIC EJECTORS
Filed Aug. 5, 1964  4 Sheets-Sheet 1
Fig. 1
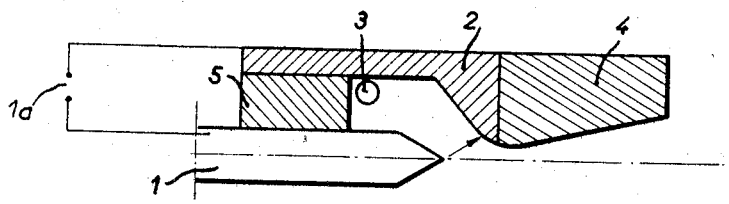
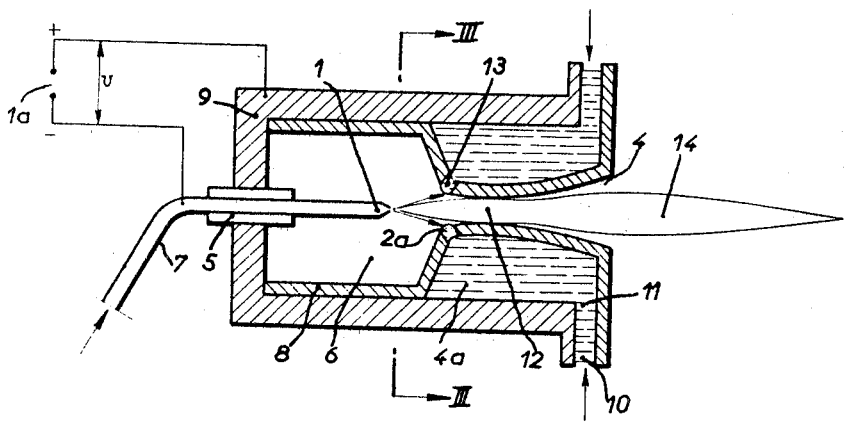
Fig. 2
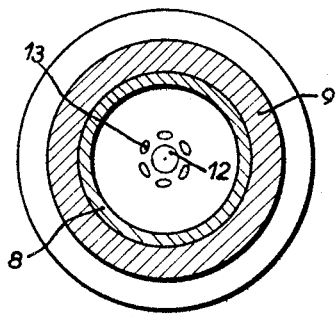
Fig. 3
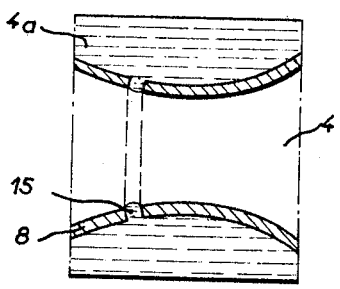
Fig. 4
INVENTORS
Franck G. M. Ferrie
Robert E. Marchand-Revers
Don P. L. F. Colombani
By Watson, Cole, Grindle & Watson
ATTORNEYS

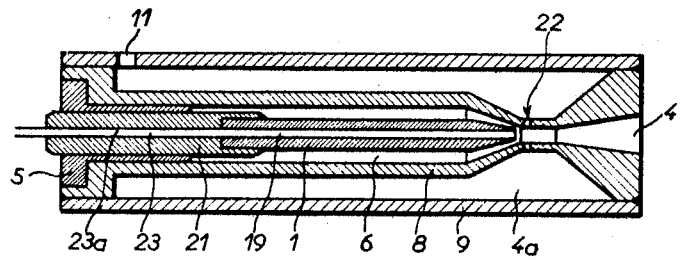
Fig.: 8
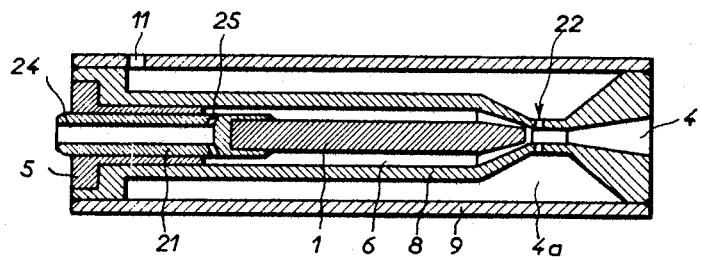
Fig.: 9
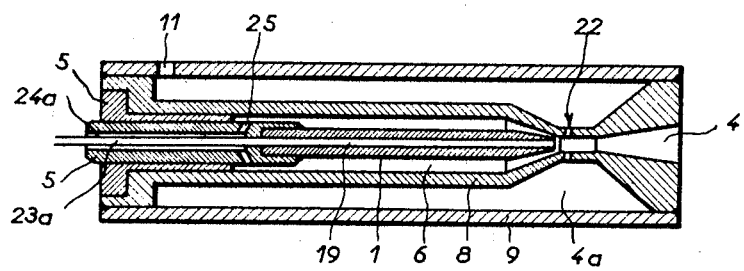
Fig.: 10

March 14, 1967   F. G. M. FERRIE ET AL   3,308,623
ELECTRO-THERMIC EJECTORS
Filed Aug. 5, 1964   4 Sheets-Sheet 4

INVENTORS
Franck F. M. Ferrie
Robert E. Marchand-Revers
Don P. L. J. Colombani
By Watson, Cole, Grindle & Watson
ATTORNEYS

3,308,623
ELECTRO-THERMIC EJECTORS

Franck Guillaume Michel Ferrie, Cachan, Robert Emile Marchand-Revers, Paris, and Don Pierre Louis Jean Colombani, Versailles, France, assignors to Societe Nationale d'Etude et de Construction de Moteurs d'Aviation, Paris, France, a company of France
Filed Aug. 5, 1964, Ser. No. 387,703
Claims priority, application France Aug. 19, 1963, 945,033
14 Claims. (Cl. 60—203)

The present invention relates to electro-thermic ejectors, and more particularly to electro-thermic ejectors of the arc or condenser-discharge type.

The operation of an ejector of this type is shown diagrammatically in FIG. 1, which is a view of an electro-thermic ejector in axial half-section. The ejector is essentially constituted by two electrodes, a cathode 1 and an anode 2, between which an arc or a spark is struck. When the apparatus is supplied with direct or alternating current from a source 1a, an arc is obtained, whereas when the source 1a is constituted by condensers which discharge into the ejector, the operation is effected discontinuously by sparks following a certain frequency. The gas which is generally brought in through tangential holes 3, arrives in turbulence about the cathode and is then ionized by the passage of the current. These ionized gases then pass out at high speed through a discharge nozzle 4. An insulating sleeve 5 is interposed between the electrodes 1 and 2, which must in principle maintain an arcing (or sparking) space which is constant in spite of wear. The anode, and even the cathode are frequently cooled by the internal circulation of a cooling liquid.

The electrodes 1 and 2 are respectively known as the cathode and anode in accordance with established custom, but it will be understood that these denominations do not in any way define the direction of passage of the current.

This type of apparatus is under study at the present time for electric space propulsion by reason of the high speeds of ejection which it is capable of supplying. Furthermore, it is utilized in supersonic wind-tunnels operating at high Mach numbers in order to simulate the conditions of re-entry into the atmosphere of space devices. Other uses are also made of them, such as the projection of materials in surface-coating processes. It must be clearly understood that these applications are only given by way of example and do not restrict the invention in any way.

In an electro-thermic ejector apparatus of this kind, and especially in the part of the apparatus which produces the ionized gases, the thermal behavior of the materials is particularly difficult to ensure because of the high temperatures reached by these gases (often higher than 8 or 10,000° K.). In order to protect the walls against erosion due to high temperatures, certain phenomena producing a pinching effect on the ionized gas are utilized, in particular the phenomena which are known to specialists by the name of "thermal pinching," "magnetic pinching" and "striction by current effect." These have the object of causing the hottest gases to move away from the walls, but they do not always give the results expected, particularly in the striking zone of the arc or the spark, that is to say on the electrodes. When ejectors are required to operate for long periods without failure (for electric space propulsion, for example), it is necessary to take precautions so as to prevent erosion from producing wear, even slowly, which would end in putting the apparatus out of service.

In addition, as the electrodes are of metal (Cu, Tu, etc.) or of carbon, their erosion introduces a more or less considerable percentage of material into the ionized gas, which material is generally unfavorable to the type of operation desired (increase of the molecular mass of this gas without any set-off for the propulsion, pollution of gases utilized in wind-tunnels, etc.).

The invention provides a solution for these problems and renders possible a very long use of the apparatus without appreciable wear.

According to the invention, the electrodes and the parts of the apparatus exposed to erosion are constituted by walls made of a consumable conductive substance chosen so that the gases produced by its consumption will effectively participate in the formation of the gas ejected, means being provided for renewing the said walls as and when they are consumed.

The consumable substance may be solid or fluid. In this latter case for example, the striking of the arc or the spark, which generate very high temperatures at the point of impact, will be established, not between the solid electrodes proper, but between two or more walls of electrodes of a fluid conductive material which vaporizes and becomes ionized, thus constituting a more or less considerable percentage of the fluid ejected. With this method, the conventional electrodes only act as supports, since the consumable material covers them in the form of a continuously renewable layer. Other parts of the apparatus may also be covered with consumable material, for example the neck of the discharge nozzle. All the parts particularly exposed to erosion are thus protected, and the ejector can be supplied only with products adequate for the objects desired.

The support of the electrodes will be of refractory and insulating material or at least of high resistivity, such as stainless steel, for example.

The walls of the electrodes and the discharge nozzle, of a consumable substance, can be obtained by introducing at suitable points in one or more electrodes and in the discharge nozzle, a liquid of appropriate physical constants, at a pressure which automatically ensures a speed of supply which is equal to the speed of wear. This pressure will be subject to regulation when so required. The circulation of this liquid in the body of the electrode or electrodes cools the material internally, and the vaporization which takes place at the point of impact of the arc tends to prevent its melting. As this liquid thus utilized as a cooling agent serves as a propellent, the energy corresponding to the heat extracted is employed for propulsion instead of having to be evacuated and in consequence lost. The heat losses are thus reduced and in a spatial application, the cooling radiators of the apparatus can be lighter and less bulky.

According to a particular feature of the invention, the liquid walls may project into the interior from the general profile of the discharge nozzle in order to protect the parts which necessarily remain solid. There are thus created secondary points of impact of the fluid jet.

The substance employed for forming the walls of fluid electrodes should, amongst other conditions:

Be conductive since it constitutes the outer wall of one or more electrodes;

Be pasty or liquid at the temperature of use;

Possess appropriate properties of ionization for its ultimate conversion to ionized fluid;

Be sufficiently dense so as to have sufficient inertia in order that it may not be too much affected by forces of all kinds (aerodynamic, electrical and magnetic), employed in the ionization chamber;

Have a melting and a vaporization point in proportion to the temperature of the chamber.

Amongst the substances which satisfy these conditions and which are suitable for use as electrodes, there may be cited, without any implied limitation: certain metals such as mercury and the alkali metals such as lithium and sodium, and also lithium hydride.

For spatial propulsion, the substances utilized must be of low molecular mass, which is the case of lithium and lithium hydride.

The description which follows below with respect to the accompanying drawings (which are given by way of examples only and without any implied limitation) will make it easy to understand the various particular features of the invention and the manner in which they are carried into effect, any arrangement brought out either in the text or in the drawings being understood to fall within the scope of the present invention.

FIG. 2 shows in longitudinal section a producing apparatus for ionized gas in which the discharge nozzle comprises localized liquid walls, and FIG. 3 is a view in transverse section taken along the line III—III of FIG. 2.

FIG. 4 is a partial view similar to FIG. 2 but showing an alternative form.

FIG. 8 shows diagrammatically a form of construction of an electro-thermic ejector of the arc type according to the invention, seen in longitudinal section, and FIGS. 9 and 10 are views similar to FIG. 8, showing other forms of construction.

Figure 5:
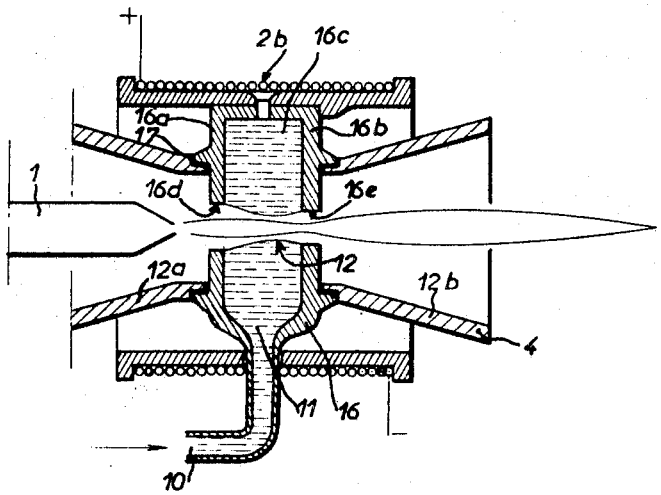
FIG. 5 is a partial view similar to FIG. 2, showing another form of construction of discharge nozzle with a consumable liquid wall.

The forms of construction shown may be applied either to an electro-thermic ejector with a direct current or alternating current arc, or to an ejector of the condenser-discharge type. The apparatus functions, as has been indicated with reference to FIG. 1, and the parts having the same function have been given the same reference numbers.

FIGS. 2 to 7 represent various forms of construction of consumable liquid electrodes, and more particularly, FIGS. 2 to 6 represent liquid anode arrangements.

Orifices can be provided on the profile of the solid discharge nozzle and spaced apart along the periphery of one or more transverse sections, depending on the case. The meniscus surfaces of the free liquid project from the inner wall of the discharge nozzle. An arrangement of this kind is shown in FIGS. 2 and 3, in which there can be seen an ionization chamber 6 with an optional axial intake conduit 7 for gas under pressure. The extremity of this conduit forms a cathode and is mounted in the chamber through the intermediary of an insulating sleeve 5. The wall 9 of the chamber is lined internally by a wall 8 which moves away from it downstream of the cathode 1 in order to form the ejection nozzle 4 with a neck 12, an annular space 4a being thus formed between these two walls 8 and 9, around the discharge nozzle 4. In this space 4a circulates a fluid under pressure introduced by pipes 10 and a collector 11. On a transverse section slightly upstream of the neck of the discharge nozzle 12 limited by the wall 8 which is insulating or at least has a resistivity greater than the consumable liquid, are pierced orifices such as 13, uniformly distributed as indicated in FIG. 3.

The wall 9 and the intake conduit of the gases are put under the voltage U of a source 1a (direct or alternating current voltage or the periodic discharge voltage of a battery of condensers). The arc or spark strikes between the cathode 1 and the liquid present in the orifice 12 forming an anode, and ionizes the gas entering at 7, together with the fluid carried away at the outlets of the holes 13, thus forming the jet 14.

Lithium or sodium in liquid form under pressure enters through the conduits 10 and the collector 11 into the annular space 4a. Through the holes 13 appear convex meniscuses of liquid 2a. The pressure in the chamber being less than that of the liquid, the latter would flow into the chamber if the heat due to the high temperature of the jet did not vaporize it while ionizing it, this latter thus contributing to the production of the jet. Although liquid lithium is much more conductive than the wall 8, the position of the orifices is chosen in such manner that the liquid meniscuses 2a forming the wall of the anode are closer to the cathode than any other part of the discharge-nozzle, in order that the electrically-charged particles will effectively strike this wall.

Furthermore, the dimensions of the orifices 13 are small enough for the whole of the liquid which passes to be vaporized and ionized without stray flow into the chamber.

The pressure of the liquid is regulated in order that the separation surface 2a may remain stationary, the flow-rate of the supply being equal to the rate of consumption.

According to an alternative form, one or a plurality of continuous slots may be formed along one or more transverse sections. The protuberance or protuberances formed by the liquid ring or rings encircle the interior of the discharge-nozzle. An arrangement of this kind is shown in FIG. 4, in which the non-continuous orifices 13 are replaced by a circular slot 15 formed in the inner wall 8 of the discharge-nozzle 4. There is thus obtained a liquid ring, the position, the longitudinal dimension and the pressure of which are regulated as in the previous case.

In the case of FIG. 4, the participation of the liquid metal in the formation of ionized gas is greater than in the examples of FIGS. 1 and 2, as the contact surface is larger.

In another arrangement of liquid anode, of which a form of construction is shown in FIG. 5, a hollow metal disc having very great resistivity as compared with that of the metal in the liquid state with which it is filled, is mounted on and insulated from the discharge-nozzle, and is brought up to a positive potential with respect to the cathode. During starting-up, the jet of ionized gas pierces the disc in the central region. There is thus formed a liquid ring as in the previous cases. In order to prevent the dispersion of this jet during the piercing of the orifice, the disc is enclosed by a solenoid 2b which applies a pinching action on the jet, thus rendering its piercing effect more efficient.

In FIG. 5, the hollow disc 16 is interposed between two parts 12a and 12b of the discharge-nozzle. The upstream wall 16a of the disc 16 can be insulated by joints 17. The liquid metal passes into the cavity 16c of this hollow disc through the conduit 10 and the collector 11.

In this liquid ring arrangement, when starting-up, the great heat of the jet directed on the central part of the disc 16, first melts the solid front wall 16a, vaporizes the interior liquid 16c, and then melts the rear face 16b thus completely piercing the disc. Following the principle previously described, there is thus obtained a consumable neck 12 of a discharge-nozzle, constituted by a liquid ring. The solid end contours, 16d upstream and 16e downstream of the ring are automatically eroded to the suitable section of opening, since the wear continues until they are sufficiently far away for the liquid to be consumed in its turn. The wear of these solid walls does not present any disadvantage, and the walls of the discharge-nozzle 4 itself are then protected from erosion.

Figure 6:
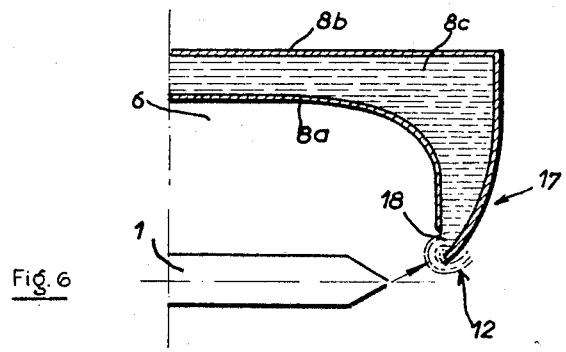
FIG. 6 shows in longitudinal half-section another arrangement of a discharge nozzle with a consumable wall.

FIG. 6 shows an alternative construction in which the discharge-nozzle itself constitutes the supporting disc for the liquid ring. This disc 17 is constituted by the downstream portion of a casing with double walls 8a, 8b enclosing the ionization chamber 6 and forming a cavity 8c which is supplied with liquid metal as in the previous examples. The circular orifice 18 formed in the central portion of the disc 17, for example by melting the walls 8a, 8b, as in the example shown in FIG. 5, forms a liquid ring constituting as previously a consumable discharge-nozzle neck 12. This arrangement permits a better channelling of the flow so that the central electrode 1 is always closer to the liquid than to the metal of the discharge-nozzle, and this is true even in the event of wear of the discharge-nozzle.

The arrangements shown in FIGS. 5 and 6 have the advantage of preventing any erosion of the solid discharge-nozzle, still more surely than with the devices of the preceding figures, since the profile of the orifice formed by the ionized jet itself is not connected to the solid discharge-nozzle, the walls of which are thus definitely further away from the jet.

With the liquid anodes described with reference to FIGS. 2 to 6, there may be associated a cathode of conventional design, but some slight wear must then be expected, and this may be compensated by an automatic advance system similar to those used for example in electric arcs intended for lighting.

Figure 7:
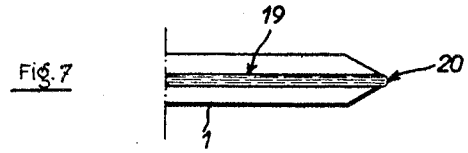
FIG. 7 is a view in axial section of a hollow cathode.

It will therefore be preferable to employ a hollow cathode such as that shown in FIG. 7. In this figure, the cathode 1 is pierced along its axis with a bore 19 which is supplied with consumable liquid. As in the case of the anodes, the metal constituting the cathode 1 has a high specific resistivity as compared with that of the liquid, and the latter forms at the outlet of the bore 19 a meniscus 20 which constitutes the active portion of the cathodee, the arc or sparks being formed between this wall 20 and the anode. Wear of the metal is thereby prevented, as has been previously explained for the anodes, and the vaporized liquid co-operates in the emission of ionized gas. In addition, the arrangement described facilitates the formation of a crater (not shown) in the meniscus 20.

FIGS. 8 to 10 illustrate by way of example various applications of the consumable liquid electrodes to an electro-thermic ejector in which in which one or a number of propellents are employed, for example lithium hydride or alternatively hydrogen and lithium. The ejector which is shown diagrammatically comprises essentially a cathode 1 mounted in a cathode-carrier 21, and an anode 8 enclosing the ionization chamber 6 and the said cathode 1, from which it is separated by the insulator 5. This anode 8 is provided with orifices 22 forming consumable electrodes, for example following the principle of FIGS. 2 or 4, and communicating with the cavity 4a which is supplied with liquid propellant by an orifice 11 pierced in the casing 9 which forms the said cavity and carries the said cathode.

In FIG. 8, the lithium hydride is simultaneously sent into the cavity 4a of the anode and into the cathode, which is pierced for that purpose with a bore 19 following the arrangement of FIG. 7, this bore 19 being extended by a conduit 23 pierced in the cathode-carrier 21.

As has already been indicated, the conduits 19 and 23 may also be eliminated and the lithium hydride can be sent into the cavity 4a of the anode only, the cathode being provided or not provided with an automatic advance device which compensates for its wear.

In FIG. 9, the cathode 1 is full or solid, and the cathode-carrier 21 is pierced with a central passage 24 which opens into the ionization chamber 6 through the orifices 25. In this arrangement, the liquid lithium is sent into the cavity of the anode 4a; the hydrogen enters through the passage 24, passes out through the orifice 25 round the cathode, and proceeds towards the point of the cathode.

The form of construction shown in FIG. 10 only differs from that of FIG. 9 in that the cathode 1 is pierced with a passage 19 which is extended into the cathode-carrier by a tube 23a, around which the passage 24 forms an annular conduit 24a communicating with the orifices 25. In this form of construction, the liquid lithium is sent simultaneously into the cavity 4a of the anode and into the conduit 23a communicating with the passage 19 in the cathode, while the hydrogen is sent into the annular conduit 24a and passes into the chamber 6 through the orifices 25 as in the case of the arrangement shown in FIG. 9.

The consumable electrodes may also be solid. As in the case of the consumable fluid electrodes, the supports of the consumable electrodes are of refractory and insulating material, or at least have a high specific resistivity. They may be hollow and supplied with a suitable material provided in the form of rods of small diameter or wires of lithium or sodium for example. These rods are pushed towards the ionization chamber in guides formed in the cathode and in the anode or the discharge-nozzle, at a suitable speed, by an appropriate feed apparatus.

Figure 11:
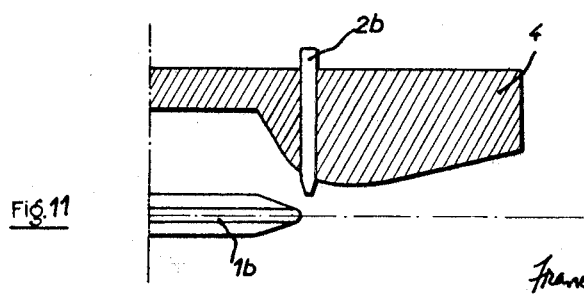
FIG. 11 is a partial view in longitudinal half-section of a device with solid consumable electrodes.

FIG. 11 illustrates diagrammatically an arrangement with a consumable anode 2b and cathode 1b composed of rods or wires. The material moves forward as it wears, in conduits formed in the centre of the cathode support and inside the discharge-nozzle 4.

Figure 12:
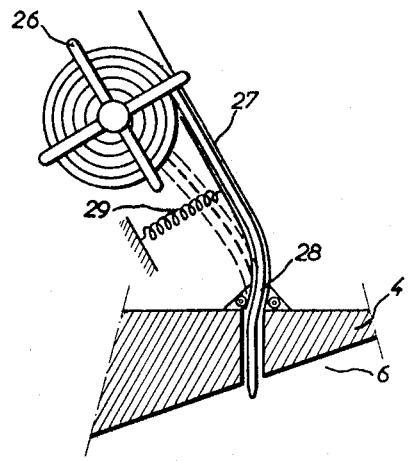
FIGS. 12, 13 and 14 are views in partial longitudinal half-section of three devices for supplying an anode with consumable electrodes.
Figure 13:
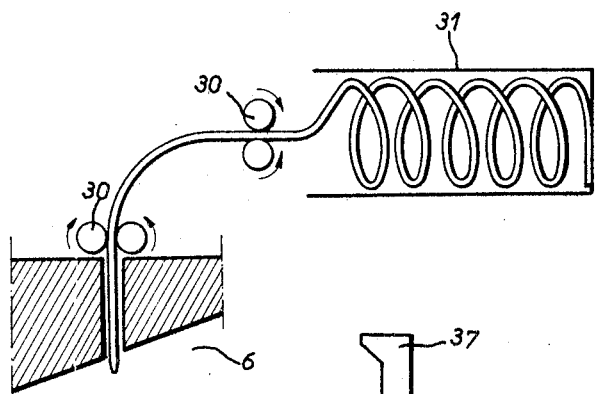

FIGS. 12 and 13 show by way of examples feed devices concerned with the feeding of wires.

In FIG. 12, the wire is pushed into the ionization chamber 6 by the rotation of a winding reel 26. The guiding is effected by the hollow arm 27 which can pivot at 28 on the structure 4 of the discharge-nozzle. A spring 29 holds this arm constantly against the periphery of the winding. The motor which drives the shaft of the winding reel 26 will be of the variable-speed type, so as to be able to maintain a constant circumferential speed of advance.

In FIG. 13, one or a number of pairs of rollers grip the wire with a suitable pressure and by rotation at appropriate speed and in the reverse direction, lead the wire previously stored in a tank 31, to the ionization chamber 6.

Figure 14:
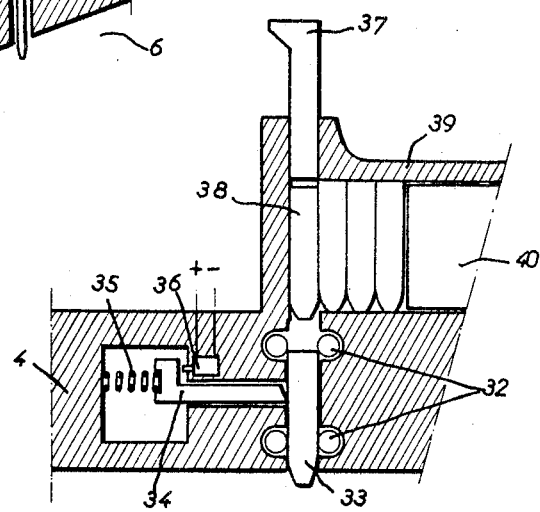

If, instead of wire, rods are employed to constitute non-continuous elements, the automatic feed of such rods may be effected by means of a device such as that which is shown in FIG. 14. In this figure, the advance movement is ensured by two pairs of driving rollers 32 mounted at the inlet and the outlet of the guide housed in the discharge-nozzle 4. As soon as the rod in use 33 has cleared the upstream part of the guide, the bolt 34, under the action of the spring 35, moves slightly and initiates, through an electric micro-switch 36, a to-and-fro movement of translation of a push-rod 37 which introduces into the guide the first of the rods 38 contained in a magazine loader 39, and pushed by a piston 40 subjected to the action of a spring or to the pressure of a neutral gas.

The automatic changing of rods may also be effected by periodic rotation by means of a cam (in the form of a Maltese cross, for example), of a barrel-plate containing the rods or of any other suitable device.

With the devices having consumable solid electrodes, a system of regulation of the speed of advance, based on the speed of wear of the electrodes, must be employed.

What we claim is:

1. An electro-thermic ejector comprising an ionization chamber, means providing a discharge nozzle out of the chamber, means for supplying a propellant to the chamber, at least two electrode devices each having an electrode portion, means for energizing the electrode devices to ionize the propellant and produce an electric discharge attaching between respective electrode portions of the electrode devices to heat the propellant and produce ejection thereof through the nozzle, the electrode portion of at least one of said electrode devices being made of consumable conductive substance adapted to be vaporized by the electric discharge attaching thereto to produce gas adapted to be ionized, heated and ejected together with the propellant, and feed means for renewing said electrode portion as fast as the consumable substance is consumed.

2. An electro-thermic ejector as claimed in claim 1, in which the chamber is supplied with propellant having a low molecular weight, for use in an arc-jet rocket, and the consumable substance is an alkali metal.

3. An electro-thermic ejector as claimed in claim 1, in which the chamber is supplied with propellant having a low molecular weight, for use in an arc-jet rocket, and the consumable substance is selected from the group consisting of lithium and lithium hydride.

4. An electro-thermic ejector as claimed in claim 1, in which the consumable substance forming the electrode portion is in fluid state.

5. An electro-thermic ejector as claimed in claim 4, in which a first electrode device is formed by the chamber which has an electrically conductive outer wall, an inner wall made of material of substantial resistivity, providing an inlet portion of the nozzle and defining an annular space within the outer wall, passage means through the inner wall, leading from the annular space to a region of the inner surface of the inner wall which is the closest to the electrode portion of a second electrode device arranged axially of the chamber opposite the nozzle, the feed means being adapted to supply the annular space with the consumable substance at such a pressure that the said substance fills the passage means and forms a meniscus surface projecting from the inner wall to form the electrode portion of the first electrode device.

6. An electro-thermic ejector as claimed in claim 5, in which the passage means comprises a plurality of orifices arranged in close side-by-side relation around the inner surface of the inner wall.

7. An electro-thermic ejector as claimed in claim 5, in which the passage means comprises an annular slot in the inner wall.

8. An electro-thermic ejector as claimed in claim 4, in which the said region of the inner surface of the inner wall is an annular region of the inlet portion of the nozzle.

9. An electro-thermic ejector as claimed in claim 4, in which a first electrode device and the means providing the discharge nozzle comprise a hollow disc made of material of substantial resistivity, having an internal cavity and forming a wall of the ionization chamber opposite the electrode portion of a second electrode device arranged axially of the chamber, and the feed means is adapted to feed the consumable substance to the cavity, the disc being adapted to form a provisional electrode portion of the first electrode device in a region positioned opposite the second electrode device when the electrode devices are first energized, and to be perforated in the said region by the electric discharge and hot propellant to force the nozzle through the consumable substance eventually forming the electrode portion of the first electrode device.

10. An electro-thermic ejector as claimed in claim 8, comprising solenoid means arranged around the hollow disc for applying a focusing effect to the propellant ejected through the nozzle.

11. An electro-thermic ejector as claimed in claim 4, in which the chamber forms a first electrode device and the means providing the nozzle, the said chamber having outer and inner walls defining an annular space therebetween which opens in a circular orifice centrally provided in a front portion of the walls opposite the electrode portion of a second electrode device arranged axially of the chamber, and the feed means is adapted to feed the consumable substance to the annular space to form a liquid ring of the substance peripherally to the orifice, the liquid ring forming the electrode portion of the first electrode device and the ejection nozzle.

12. An electro-thermic ejector as claimed in claim 4, comprising an electrode device axially arranged in the chamber, which comprises an electrode member having a passage therethrough leading to at least one orifice, the feed means being adapted to feed the consumable substance into the passage to form a free surface projecting through the orifice to constitute the electrode portion of the said electrode device.

13. An electro-thermic ejector as claimed in claim 1, wherein the consumable substance is a solid substance in elongated form, at least one electrode device comprises an electrode member having at least one guiding passage therethrough for the elongated solid substance, leading to an aperture of said member, and the feed means is adapted to convey the elongated solid substance through the passage and past the aperture to form a projection forming the electrode portion of the said electrode device.

14. An electro-thermic ejector comprising an ionization chamber, ejection nozzle and anode assembly including outer and inner walls defining an annular space therebetween, and passage means through the inner wall circularly arranged around the nozzle to lead from the annular space to an inlet region of the nozzle; means for supplying the annular space with liquid lithium hydride to form a meniscus surface projecting from the inner wall into the said inlet region of the nozzle; a cathode member axially arranged in the chamber, having a passage therethrough leading to an orifice of said member in close relationship to the meniscus surface; means for supplying the passage with liquid lithium hydride to form a second meniscus surface projecting through the orifice; and means for energizing the anode and cathode member to produce electric discharge attaching between the said meniscus surfaces to vaporize, ionize and heat lithium hydride and produce ejection thereof through the nozzle.

References Cited by the Examiner

UNITED STATES PATENTS

| 2,951,143 | 8/1960 | Anderson et al. | 219—121 |
| 3,082,314 | 3/1963 | Arata et al. | 219—75 |
| 3,149,459 | 9/1964 | Ulam | 60—35.5 |

OTHER REFERENCES

Propulsion Systems for Space Flight by Corliss, McGraw-Hill, 1960, New York, page 199.

Space Aeronautics, May 1960, pages 42–45 relied on.

CARLTON R. CROYLE, *Primary Examiner.*